US009702347B2

(12) United States Patent
Madson

(10) Patent No.: US 9,702,347 B2
(45) Date of Patent: Jul. 11, 2017

(54) WIND TURBINE SYSTEM FOR GENERATING ELECTRICAL POWER

(71) Applicant: Charles Martin Chavez Madson, Iloilo (PH)

(72) Inventor: Charles Martin Chavez Madson, Iloilo (PH)

(*) Notice: Subject to any disclaimer, the term of this patent is extended or adjusted under 35 U.S.C. 154(b) by 0 days.

(21) Appl. No.: 15/175,794

(22) Filed: Jun. 7, 2016

(65) Prior Publication Data
US 2017/0114778 A1 Apr. 27, 2017

Related U.S. Application Data

(63) Continuation of application No. PCT/PH2015/000017, filed on Oct. 23, 2015.

(51) Int. Cl.
| | |
|---|---|
| *F03D 9/00* | (2016.01) |
| *H02P 9/04* | (2006.01) |
| *F03D 13/25* | (2016.01) |
| *F03D 1/06* | (2006.01) |
| *F03D 7/02* | (2006.01) |
| *F03D 13/20* | (2016.01) |
| *H02K 7/18* | (2006.01) |
| *B63B 35/44* | (2006.01) |

(52) U.S. Cl.
CPC ............ *F03D 13/25* (2016.05); *F03D 1/0608* (2013.01); *F03D 7/0244* (2013.01); *F03D 9/001* (2013.01); *F03D 9/002* (2013.01); *F03D 13/20* (2016.05); *H02K 7/1823* (2013.01); *B63B 2035/446* (2013.01); *F05B 2220/704* (2013.01); *F05B 2240/60* (2013.01); *F05B 2260/40311* (2013.01)

(58) Field of Classification Search
CPC ........ F03D 13/20; F03D 13/25; F03D 1/0608; F03D 7/0244; F03D 9/001; F03D 9/002
USPC .............................................. 290/44, 54, 55
See application file for complete search history.

(56) References Cited

U.S. PATENT DOCUMENTS

| | | | | |
|---|---|---|---|---|
| 2,454,058 A | * | 11/1948 | Hays ......................... | F03D 9/17 290/4 D |
| 3,806,733 A | * | 4/1974 | Haanen .................... | F03B 17/02 290/44 |
| 4,423,333 A | * | 12/1983 | Rossman .............. | F03D 7/0224 290/44 |

(Continued)

*Primary Examiner* — Tulsidas C Patel
*Assistant Examiner* — Thomas Quigley
(74) *Attorney, Agent, or Firm* — R. Michael West

(57) ABSTRACT

The apparatus includes a wind turbine system for the collection of wind energy and the conversion thereof through staged-compression into highly compressed gas. The highly compressed gas is routed to a central tank, and then expanded into a plurality of concentric ring tanks, each storing gas at successively lower pressures. The cooling resulting from this expansion is utilized to cool hot compressed gas from an intermediate line of gas compressors, increasing the efficiency of the following compressors. This absorption of heat also improves the efficiency of the gas turbines driving electrical generators. The gas compressor in each wind turbine is located near ground level, and driven by a vertical shaft passing through the wind turbine support tower. One embodiment has conventional radially extending blades, and another embodiment has ducted blades to withstand higher winds. Both ground mounted and deep water adaptions for the wind turbines are disclosed.

18 Claims, 13 Drawing Sheets

(56) References Cited

U.S. PATENT DOCUMENTS

| | | | | |
|---|---|---|---|---|
| 7,895,744 | B2* | 3/2011 | Numajiri | B66C 17/04 254/334 |
| 2007/0102938 | A1* | 5/2007 | Poole | F03D 3/0472 290/55 |
| 2010/0060013 | A1* | 3/2010 | Csefko | F03B 13/00 290/55 |
| 2010/0107621 | A1* | 5/2010 | Garvey | F03D 1/065 60/327 |
| 2011/0061836 | A1* | 3/2011 | Ingersoll | F03D 9/028 165/104.13 |
| 2011/0169275 | A1* | 7/2011 | Garvey | F02C 1/02 290/1 R |
| 2012/0104763 | A1* | 5/2012 | Lind | B64C 31/06 290/55 |
| 2012/0242084 | A1* | 9/2012 | Agtuca | F03D 1/0675 290/44 |

* cited by examiner

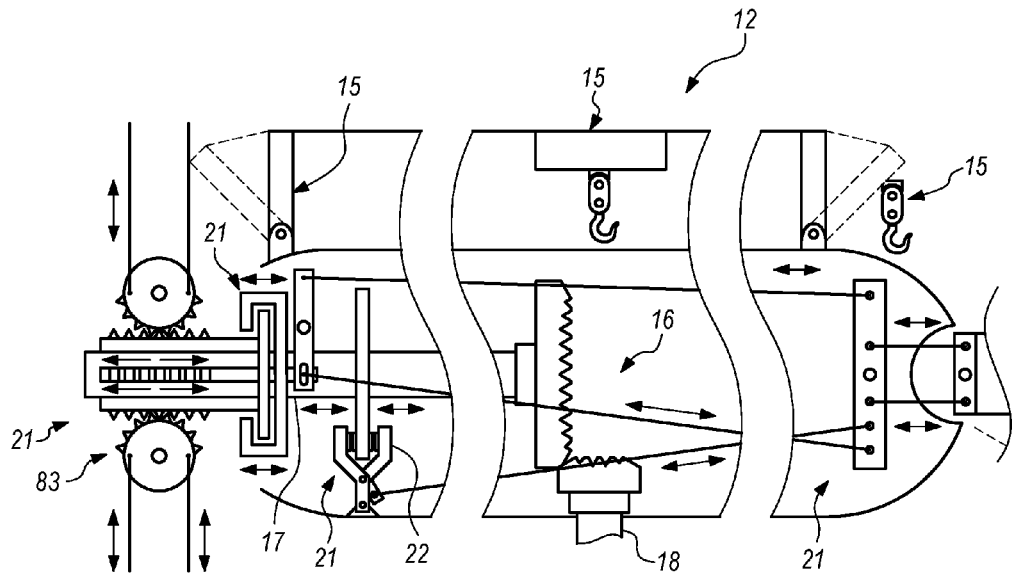
FIG. 9
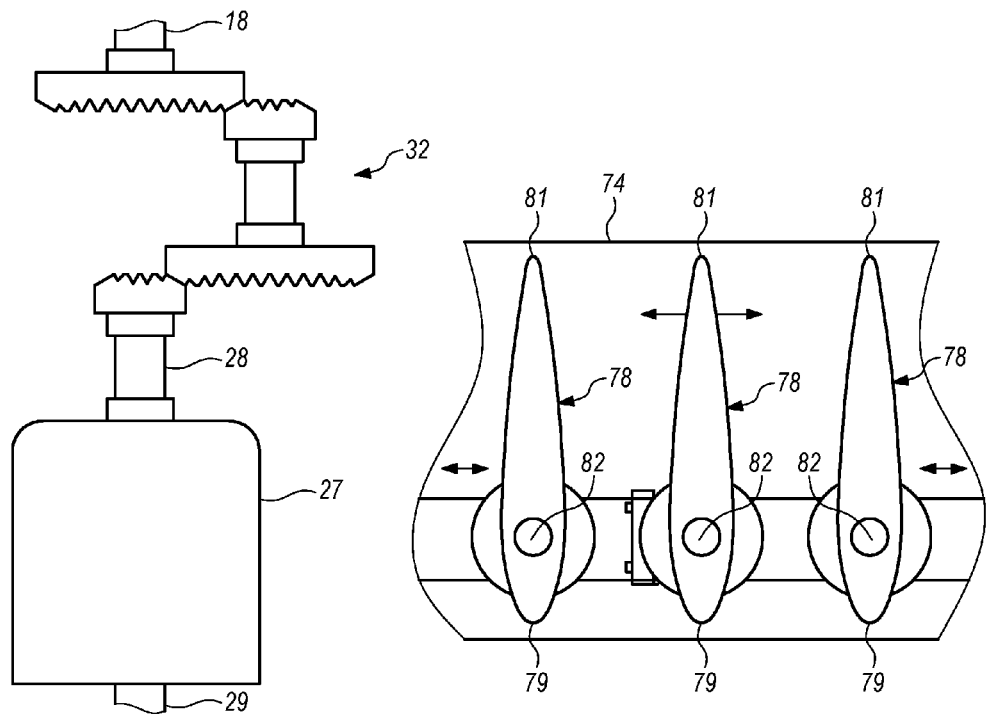
FIG. 10
FIG. 11

WIND TURBINE SYSTEM FOR GENERATING ELECTRICAL POWER

BACKGROUND OF THE INVENTION

1. Field of the Invention

The invention relates generally to wind turbine systems for the collection and storage of wind energy to be used for the generation of electrical energy. More specifically, the invention relates to a plurality of land or water-based wind turbines outputting compressed gas, in which the outputs are variously arranged in serial and parallel relation to provide staged compression of the gas, in which an efficient storage system for the high pressure gas outputted by the wind turbines is provided, and in which gas cooling and heating systems are in communication between certain of the wind turbines and the staged decompression storage system, enhancing the efficiencies of both the wind turbines and the air or gas turbines driven by the stored pressurized gas to produce electricity.

2. Description of the Prior Art

Applicant herein is the named inventor in U.S. Pat. No. 9,030,039 (the '039 Patent), issued May 12, 2015, for a Wind Turbine And Compressed Gas Storage System For Generating Electrical Power. As shown in the '039 Patent, the upper head portion of each wind turbine is pivotally mounted on a lower storage tank portion. The storage tank portion supports the head portion of the wind turbine at an elevated location to encounter wind forces effectively. The storage tank portion also serves to house a gas turbine compressor in its upper end and to store compressed gas in one or more internal tanks.

In this system, a plurality of such wind turbines is serially interconnected for staged compression to output high pressure compressed gas. Rows of such serially interconnected wind turbines have their outputs connected in parallel, to increase the volume of compressed gas.

The combined outputs of these wind turbines is fed to a reserve tank for storing the compressed gas. The reserve tank includes a plurality of concentric ring-like tanks, each tank storing compressed gas at stepped pressures, varying from the highest pressure central tank to the lowest pressure outermost ring tank. Compressed gas from the outermost ring tank is fed to one or more air turbines driving a respective electrical generator.

Cited by the Examiner in the prosecution of the '039 Patent was US 2013/0305704 A1, now U.S. Pat. No. 8,850,808, granted to Ingersoll et al., for a Compressor And/Or Expander Device. In the '808 Patent, FIG. 1 shows a Wind Farm 102 in communication with a Motor/Alternator 110, an Actuator 112, a Compressor/Expander 120, and a Storage Structure 122. The Power Grid 124 is also shown in two-way communication with the Motor/Alternator 110. FIG. 2A shows $1^{st}$, $2^{nd}$ and $3^{rd}$ stage compressors serially interconnected and driven by a common hydraulic actuator.

Also cited in the prosecution of the '039 Patent was U.S. Pat. No. 4,423,333, issued to Rossman, for a Horizontal Axis Wind Energy Conversion System With Aerodynamic Blade Pitch Control. Rossman provides a flyweight mechanism on each rotor blade to provide aerodynamic efficiency at operating wind velocities, and near constant speed and zero lift pitch of the rotor blades when rotational speeds exceed the design speed of the system. Gravity neutralization means (FIG. 6) comprised of a bevel gear and pinions couples the blades together, while the flyweight mechanism connected to the bevel gear acts to neutralize centrifugal torque on the rotor blades.

U.S. Pat. No. 3,806,733, is another reference cited by the Examiner in the prosecution of the '039 Patent. The '733 Patent shows a Wind Operated Power Generating Apparatus, including an air compressor 35 at the top of a tower 20, a pressurized air reservoir and supply tank 14, an operating tank 16, and an electric current generator 18. The supply of pressurized air inflates air cells which are attached to an endless belt. The air cells rising in a tank of fluid cause the belt to be driven upwardly, operating the electric current generator.

Lastly, in U.S. Pat. No. 2,454,058, cited by Applicant in the prosecution of the '039 Patent, an Apparatus For Converting Intermittent Power To Continuous Power is taught. In this arrangement, the output from a wind-driven air compressor is directed underground into a "shot hole" 114 where the compressed air forces water away from the drill hole and filling the voids with compressed air. The reverse occurs when air pumping is discontinued, so as to drive the air engine 104 and generator 106 for operation during quiescent wind conditions.

SUMMARY OF THE INVENTION

The aeronautical and robust design features of the wind turbines of the present invention ensure their survivability in extremely strong wind storms. These design features include the low aspect ratio of the propeller blades, and the mechanisms to feather the propeller blades into a fully neutral position and to brake the output drive shaft of the propeller blade assembly under strong wind conditions.

Two embodiments of the propeller blades are disclosed, one with a plurality of conventional blades extending from a central hub, and the other a ring fan propeller having a plurality of short blades arranged in a peripheral ring assembly supported by spokes extending from a central hub.

Two constructions for the wind turbine towers are disclosed, one adapted for installation on the ground, and the other having special features for installation in deep water environments. This flexibility allows the wind turbine system to be installed in the most favorable wind locations, whether they be on land or over water.

All of the heavy components present in the nacelles at the top of prior art wind turbines have either been eliminated or moved to the base of the wind turbine tower. This reduces wind loads, eliminates the need for large construction cranes for assembly and maintenance, and places many high maintenance items at a much more convenient location for repair or replacement.

The apparatus includes a plurality of wind turbines, serially interconnected for staged compression to output high pressure compressed gas. A plurality of such serially interconnected lines may also have their respective outputs connected together in parallel, to increase the volume of compressed gas produced.

The combined output from the wind turbines is fed to a storage tank system adapted to store a large quantity of compressed gas. The storage tank includes a plurality of concentric ring-like tanks, each tank being interconnected to inner and outer adjacent tanks, each tank storing compressed gas at stepped pressures, varying from the highest pressure central tank, fed by the gas outputted from the wind turbines, to the lowest pressure outermost tank. The plurality of tanks is interconnected through pressure regulated valves to effect the stepped decompression and expansion of the contained gas. Compressed gas from the outer ring tank is fed to one or more gas turbines driving a respective electrical generator.

The present invention has a simplified and improved gas cooling and heating circulation system. This increases the efficiency of the higher pressure output wind turbines by drawing off hot gas outputted by a selected row of wind turbines, and circulating that hot gas through a heat exchanger line passing through the outer ring tank in the ring tank storage system.

Because the gas in the outer ring tank is relatively cool from the successive stages of gas expansion, this volume of stored pressurized gas is effective to cool the hot incoming gas circulated from the row of wind turbines. This cooled incoming gas is then returned to the next row of wind turbines, making their operation more efficient.

Through this same operation, the excessive heat from gas circulated through the heat exchanger line is effective to raise the temperature of the gas stored in the outer ring tank, making the operation of the gas turbines driving the electrical generators more efficient.

BRIEF DESCRIPTION OF THE DRAWINGS

FIG. 9 is a side elevational view, comprising a fragmentary pictorial representation of the feathering and braking mechanisms for the propeller blades and the output drive shaft;

FIG. 10 is a side elevational view, comprising a pictorial representation of a multiplier gear train and gear box assembly;

FIG. 11 is a fragmentary top plan view of three of the propeller blades of the ducted ring fan propeller;

DETAILED DESCRIPTION OF THE PREFERRED EMBODIMENT

Figure 1:
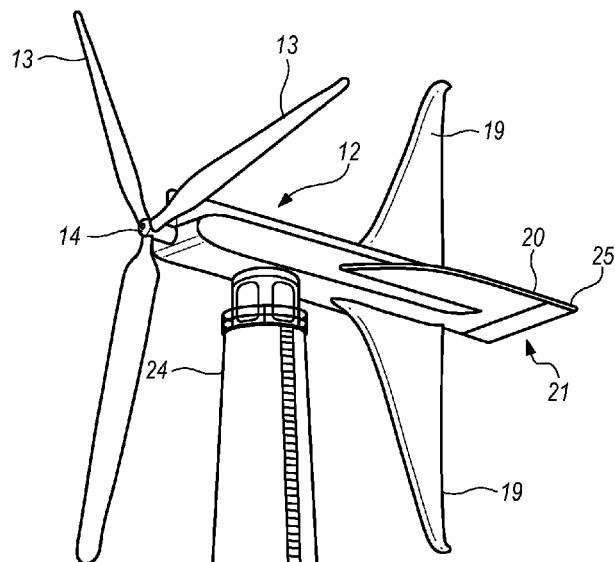
FIG. 1 is a perspective view of a plurality of wind turbines of a first embodiment, shown installed in a deep water environment.
Figure 1:
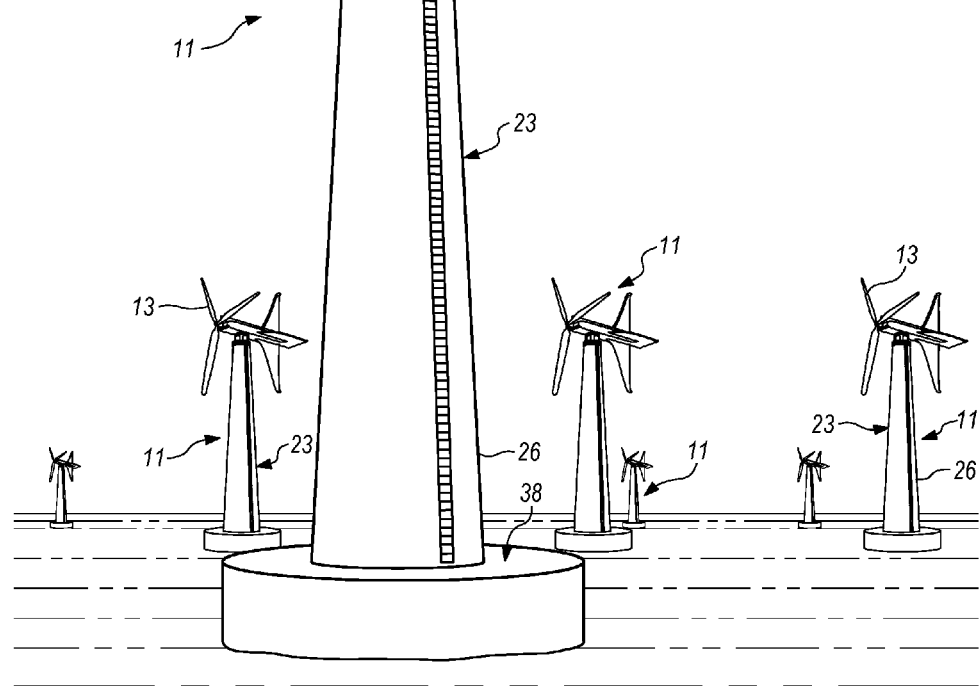
Figures 3, 4, 5:
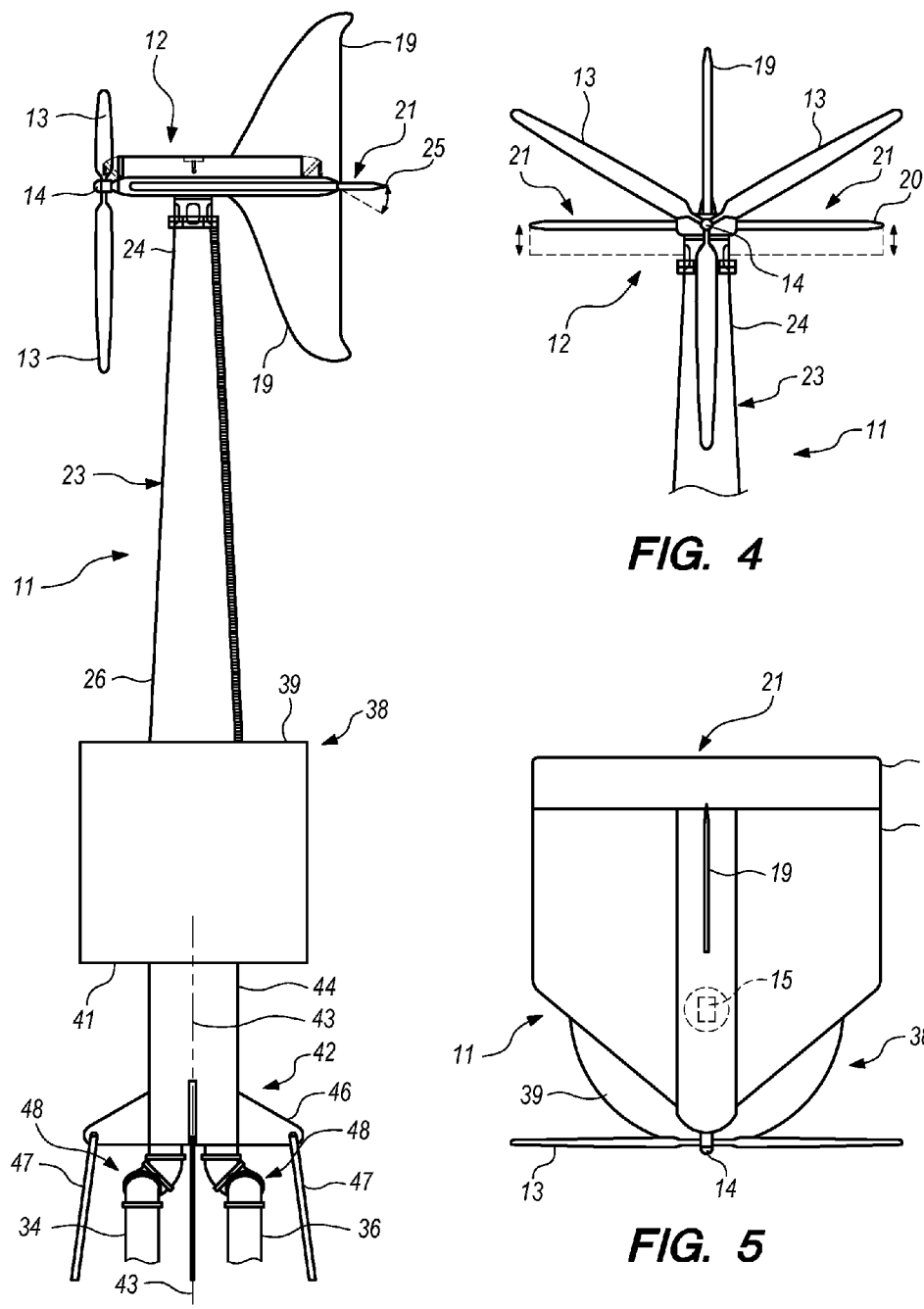
FIG. 3 is a side elevational view of the first embodiment of the wind turbine adapted for deep water mooring, showing conventional propeller blades, a support tower, a flotation tank, a ballast keel, and 3-axis couplings for the input and output gas lines.
FIG. 4 is a fragmentary, front elevational view of the wind turbine head of FIG. 3, the representation of the elevator in broken line corresponding to its position during low or no wind conditions.
FIG. 5 is a top plan view of the wind turbine head and flotation tank, shown in FIG. 3.

The first embodiment of the wind turbine 11 is shown generally in FIG. 1 and in FIGS. 3-5, inclusive. Wind turbine 11 comprises a head portion 12, having at least two propeller blades 13 extending radially from a hub 14. The propeller blades 13 have respective longitudinal axes, and are mounted to hub 14 for rotation about these longitudinal axes between a first rotational position where the propeller blades 13 are fully engaged with incoming wind, and a second rotational position where the propeller blades are minimally engaged with incoming wind.

The hub 14 is further mounted for rotation on a front end of head portion 12, directed toward incoming wind. A first gear assembly 16, preferably comprising a pair of bevel gears, is mounted in the head portion 12 between the front end and the rear end of head portion 12. The first gear assembly 16 has a first shaft 17 interconnected to hub 14, and a second shaft 18 directed vertically and downwardly.

One or more derricks 15 may be mounted on the upper side of head portion 12. Structurally integrated with the wind turbine 11, derricks 15 are useful during the initial assembly of the components comprising head portion 12, and are also convenient for later servicing these same components. In this manner, derricks 15 substantially eliminate the need for separate tower cranes after the main components of the wind turbine have been erected.

A rudder 19 having lower and upper portions, is mounted on the rear end of the head portion 12. Also included within head portion 12 is feathering and braking means 21, responsive to the incoming wind, for maintaining propeller blades 13 in the first rotational position when the incoming winds are light and moderate, and for progressively and proportionally rotating the propeller blades 13 into the second rotational position as the incoming winds increase from moderate to strong in strength. Feathering and braking means 21 includes fin assembly 20 and an elevator 25, pivotally attached to the trailing edge of the fin assembly 20. The feathering and braking means 21 further applies rotational braking forces to first shaft 17 by means of disc and caliper assembly 22, when the incoming winds are exceptionally strong.

Wind turbine 11 also includes a tower 23, having an upper end 24 and a lower end 26. Head portion 12 is rotationally mounted to upper end 24 of tower 23, so that rudder 19 is effective to orient the front end of head portion 12 and propeller blades 13 toward any incoming wind. A gear box 27 having an input shaft 28 and an output shaft 29, is located within the lower end 26 of tower 23. A main shaft 31 extends vertically through tower 23, interconnecting second shaft 18 and input shaft 28. A drive train 32 may optionally be included, further to convert the rotational speed of main shaft 31 as needed.

A turbine gas compressor 33 is located below tower 23, and is driven by output shaft 28. Turbine gas compressor 33 has a gas inlet 34 and a gas outlet 36. Check valves 37 are provided at the output of gas compressor 33 to prevent backflow into and through compressor 33 during a system shutdown or when a quiescent wind condition arises.

In the event that wind turbine 11 is installed over water, a flotation tank 38 is provided for buoyant support and vertical stability for turbine 11, and to house turbine gas compressor 33. Flotation tank 38 has a top end 39 and a bottom end 41, as shown most clearly in FIG. 3. The top end 39 of flotation tank 38 is attached to lower end 26 of tower 23. Also provided is a ballast keel 42, having a vertical axis 43, an upper portion 44, and a lower portion 46. The vertical axis 43 of ballast keel 42 is aligned with the longitudinal axis of tower 23, and the upper portion 44 of keel 42 is attached to the bottom end 41 of flotation tank 38. To provide further stability in orientation and location for the wind turbine 11, a plurality of mooring cables 47 is provided, having respective upper ends attached to lower portion 46 of ballast keel 42.

Owing to the inevitability of some movement of wind turbine 11 over open water, a 3-axis coupling 48 is provided. A coupling 48 is included at least at the gas outlet 36 of turbine gas compressor 33. If the wind turbine 11 is one of the stage 2 through stage 10 turbines, and therefore has a gas inlet 34 interconnected to the gas outlet 36 of a previous stage compressor 33, a coupling 48 will also be included at the gas inlet 34. An example of such a wind turbine 11 is shown in FIG. 3.

Figure 23:
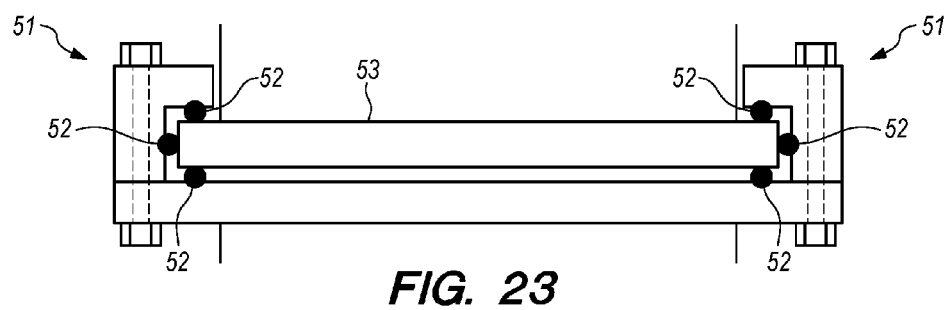
FIG. 23 is a schematic representation of a swivel joint.

Each 3-axis coupling 48 comprises a plurality of curved pipe sections 49 joined by respective swivel joints 51. Each swivel joint 51 includes means for maintaining a gas-tight seal within a respective swivel joint 51, irrespective of the position or rotation of pipe sections 49. In the example shown in FIG. 23, groups of o-rings 52 are provided around the top, bottom, and side edges of the end flange 53 of a pipe section 49. Ceramic or rubber gaskets may also be considered structural equivalents of these o-rings, for purposes of the present disclosure.

It is apparent that the present design lowers all heavy components of the wind turbines 11, aside from the head portion 12 and its associated components, to the base or lower end 26 of the tower 23 of each wind turbine 11. These heavy components include the turbine gas compressor 33, the gear box 27, the drive train 32, and all input and output gas plumbing associated with the turbine gas compressor 33. This relocation of the heavy components to a lower position within the wind turbine 11, speeds up construction and makes future maintenance operations much simpler and safer.

In the event that wind turbine 11 is installed over land, a very similar construction is employed to that just described. For example, in FIG. 15, a stage 1 wind turbine adapted for land installation is shown. In this arrangement a tower base 54 is provided, immediately below the lower end 26 of the tower 23. The tower base 54 may be located partially underground, and preferably includes access doors or panels (not shown), for ready access to the turbine gas compressor 33 and its associated gas plumbing.

Figure 15:
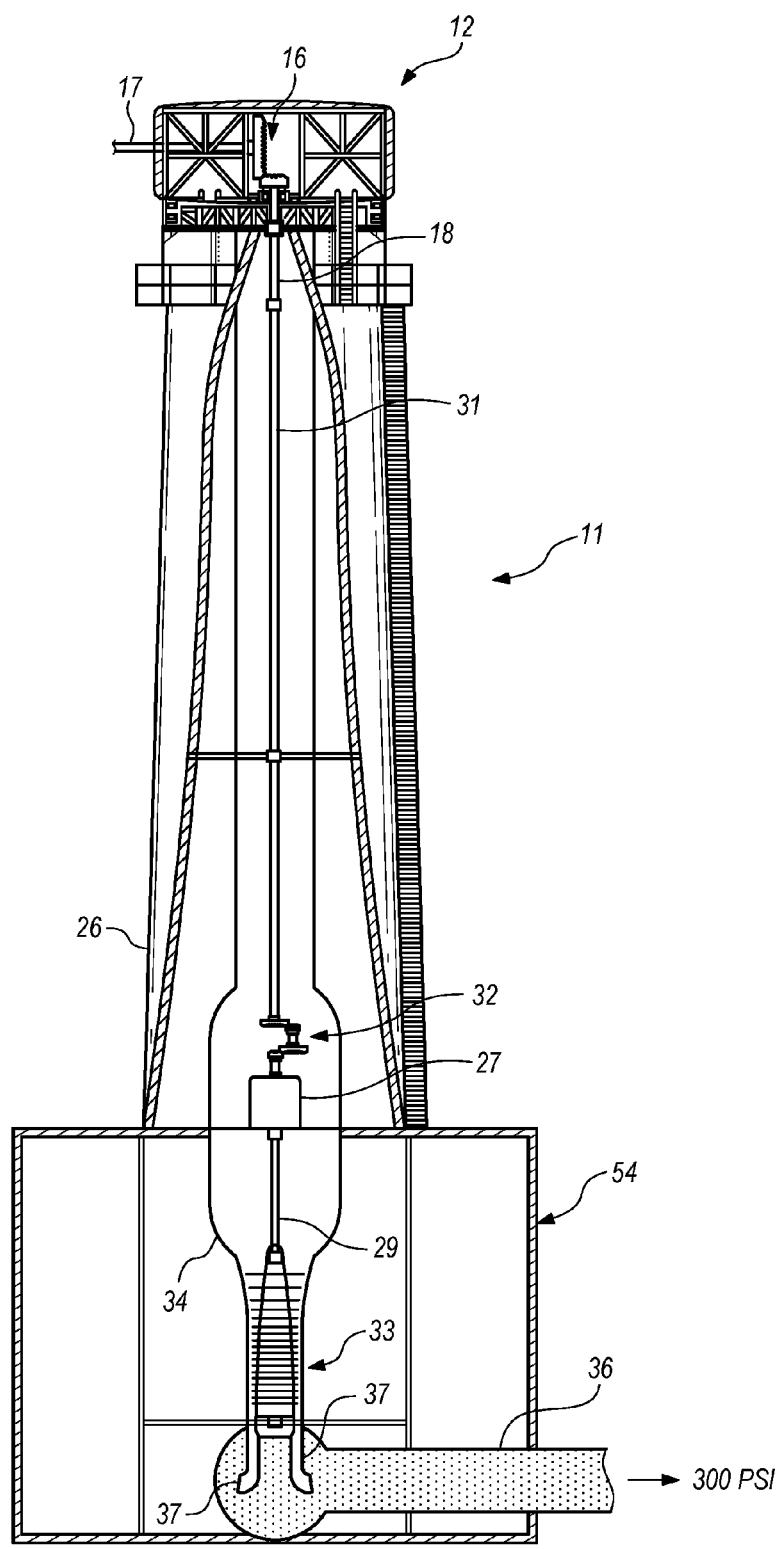
FIG. 15 is a representation of a wind turbine operating as an open system with ambient air from the upper head portion taken directly into an air turbine compressor, a portion of the head, tower, and base being broken away to reveal inner components.

The wind turbine 11 shown in FIG. 15 is termed a stage 1 wind turbine, as its turbine gas compressor 33 has a gas inlet 34 in communication with the ambient air. This arrangement is also termed an "open" system, to be contrasted to a "closed system" described below. A stage 1 wind turbine 11 compresses ambient air sufficiently so that its air outputted through gas outlet 36 is at approximately 300 psi. This outputted air, in turn, is fed to the gas inlet 34 of a stage 2 turbine gas compressor 33.

Figure 14A:
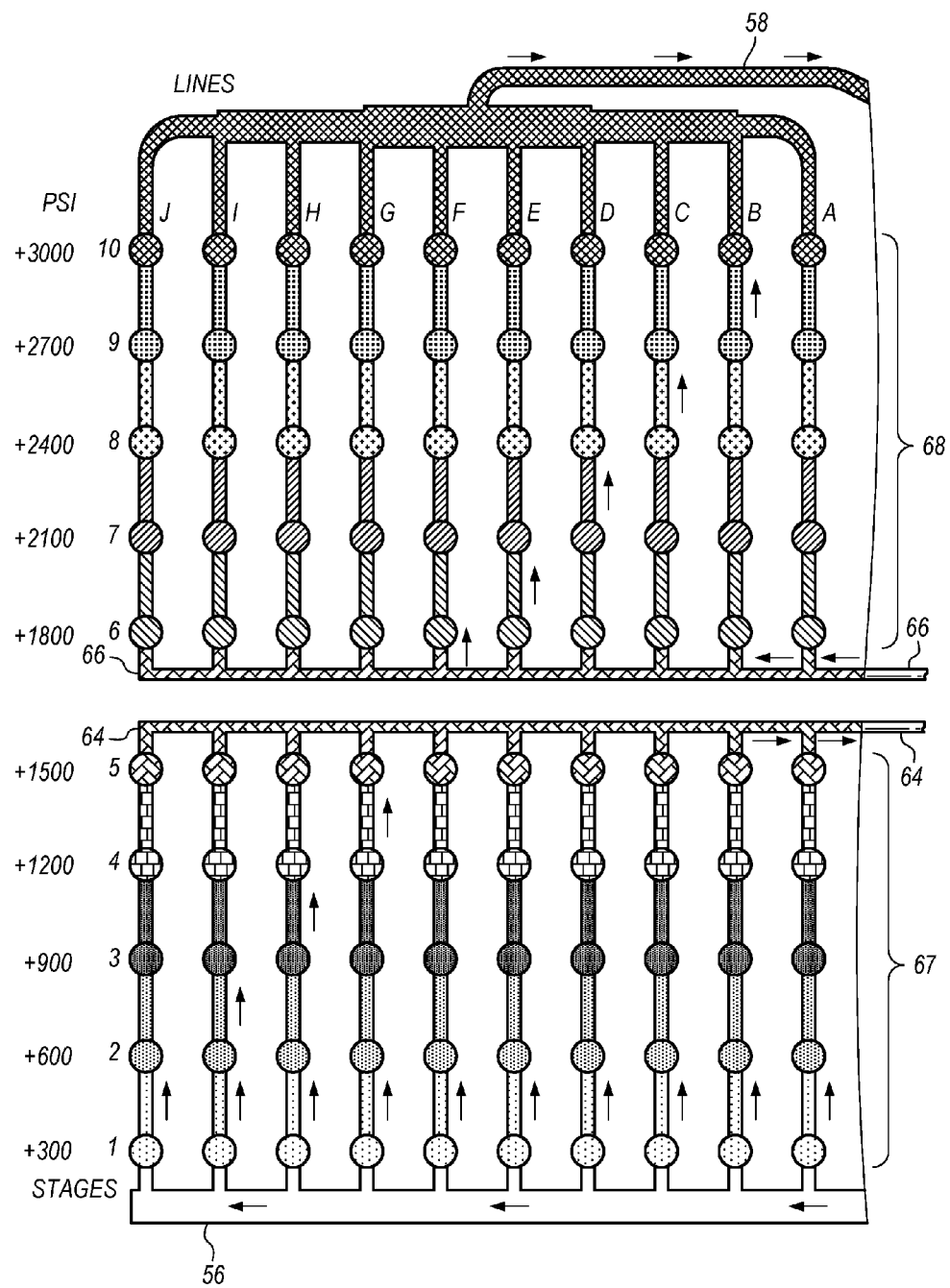
FIGS. 14A and 14B comprise a schematic representation of a wind turbine system, including an array of wind turbines arranged in stages 1 through 10 and lines A through J, the array of wind turbines being interconnected in serial and parallel fashion for staged compression of gas, the high pressure gas outputted therefrom being delivered to the concentric ring tank storage system, the output from the stage 5 compressors being circulated through a heat exchanger line within the outermost ring tank and then being delivered to the input of the stage 6 compressors, outputs from the outermost ring tank being connected to respective electrical power gas turbines and generators, the graphical patterns used in FIGS. 14A and 14B representing respective pressures in the wind turbines and the ring tanks, according to the provided legend.
Figure 14B:
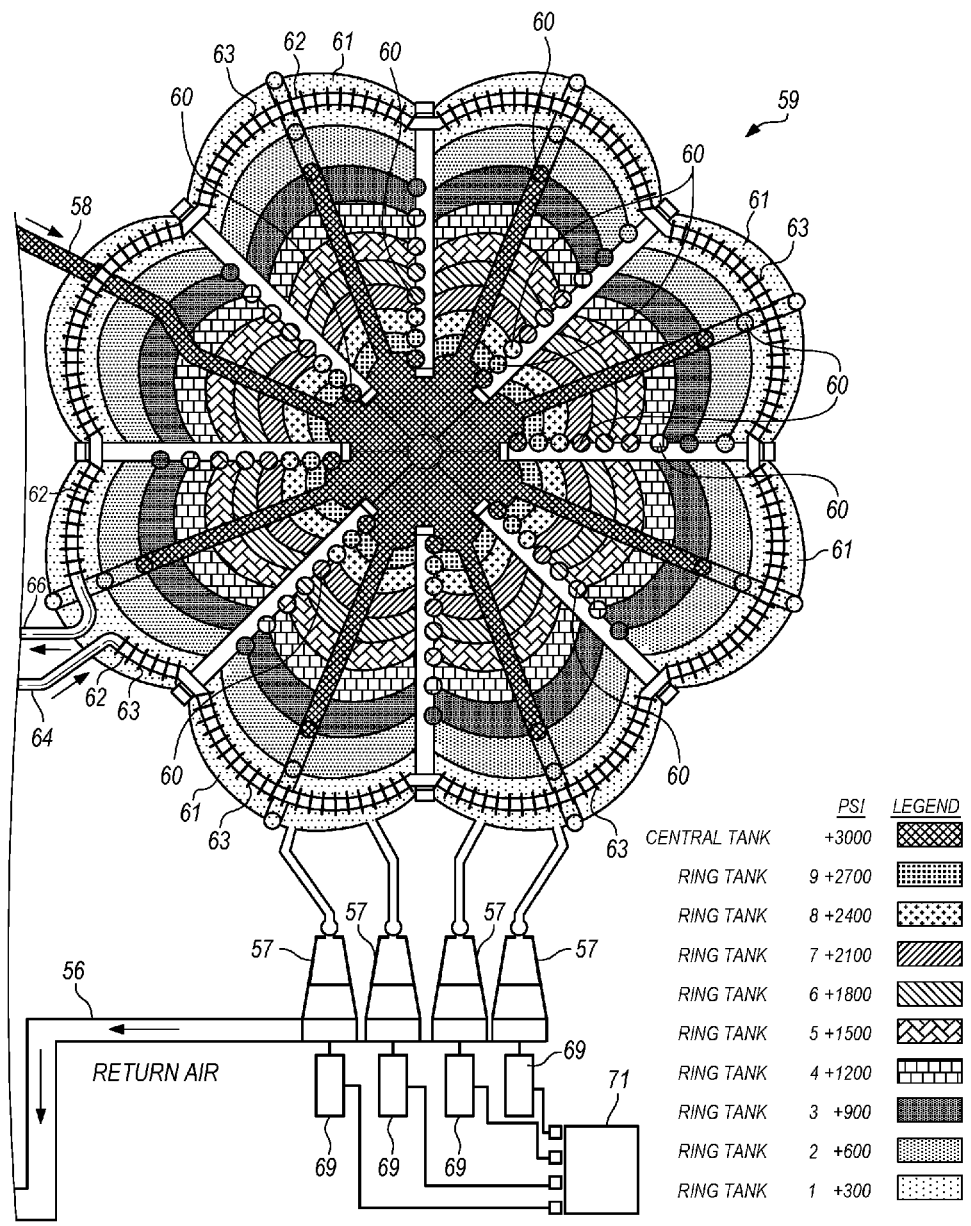

Making particular reference to FIG. 14A, it can be seen that lines A-J of the stage 1 wind turbines 11 have their outputs directed to a respective stage 2 wind turbine 11. The serial interconnections of stage 1 through stage 10 wind turbines results in successive increases of approximately 300 psi for each stage. This staged air compression results in an output of approximately 3000 psi from the plurality of stage 10 wind turbines 11, toward the top of FIG. 14A. The arrangement of wind turbines 11 in FIG. 14A comprises a "closed system", as the air or gas fed to the inlets of the stage 1 wind turbines comes from a return air line 56. As will be seen in FIG. 14B, return air line 56 is connected to the discharge of gas turbines 57. In other words, after the compressed gas is utilized to drive gas turbines 57, it is returned to the stage 1 wind turbines, to be reused. Air or gas used in a closed system may be conditioned and filtered, to reduce moisture and contaminants, for example. Air used in an "open system" is simply used one time by the system, and discharged to the ambient air from gas turbines 57.

Figure 16:
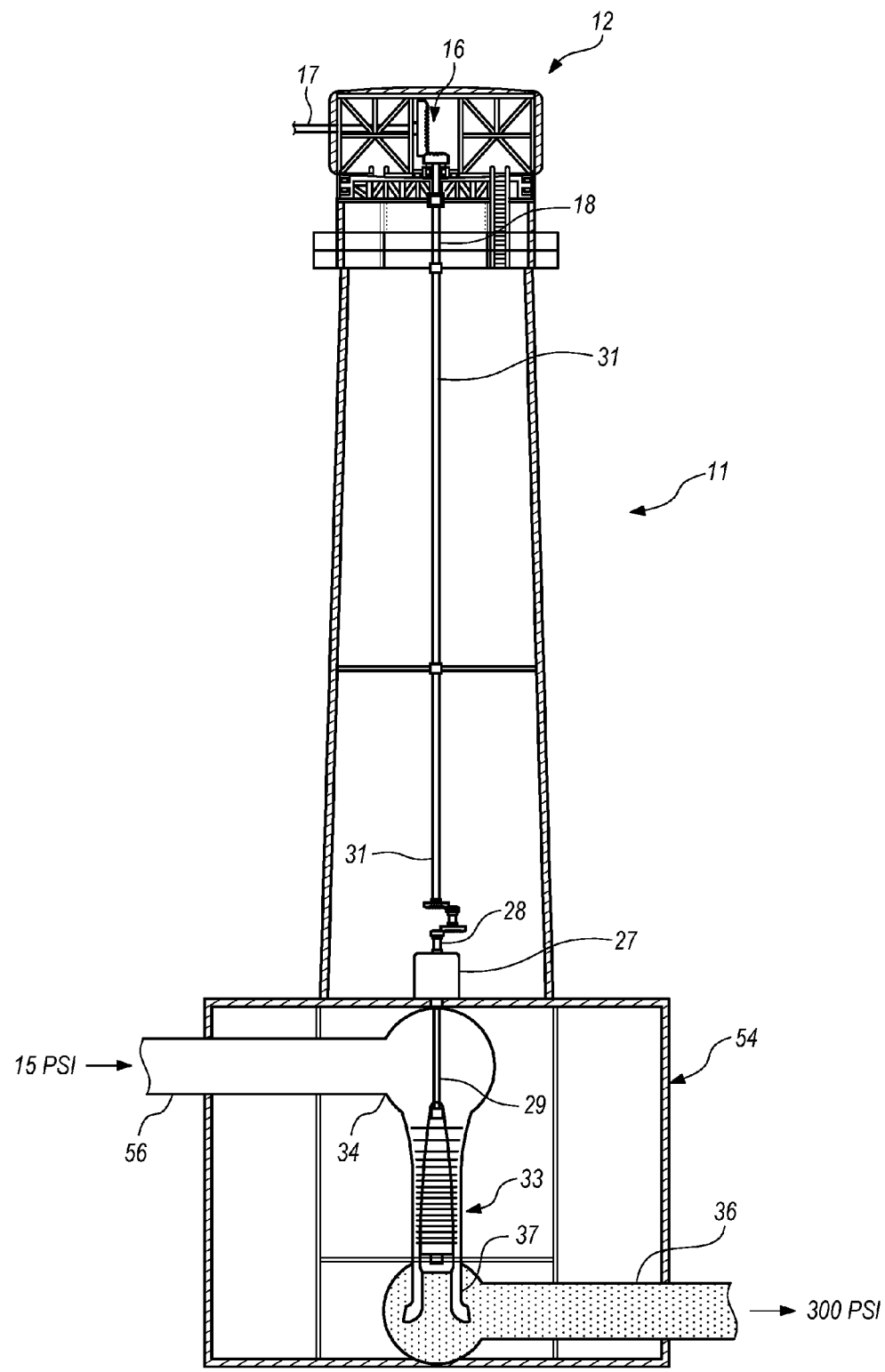
FIG. 16 is a cross-sectional view of a stage 1 wind turbine configured for use in a closed system, using return air or gas from electrical power gas turbines.
Figure 17:
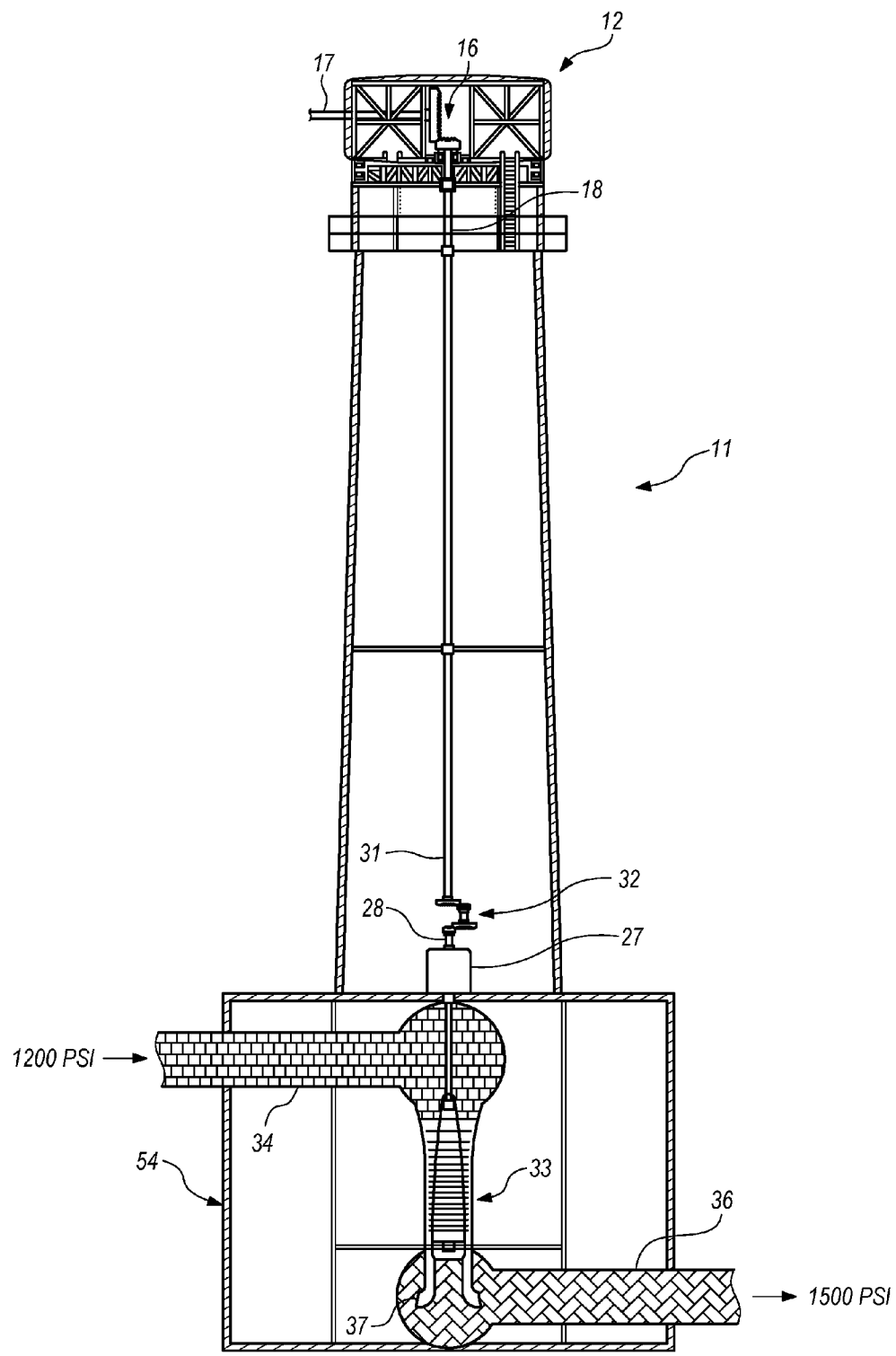
FIG. 17 is a cross-sectional view of a stage 5 wind turbine, showing the gas supplied at approximately 1200 psi from a stage 4 turbine and being outputted at approximately 1500 psi to the heat exchanger line.
Figure 18:
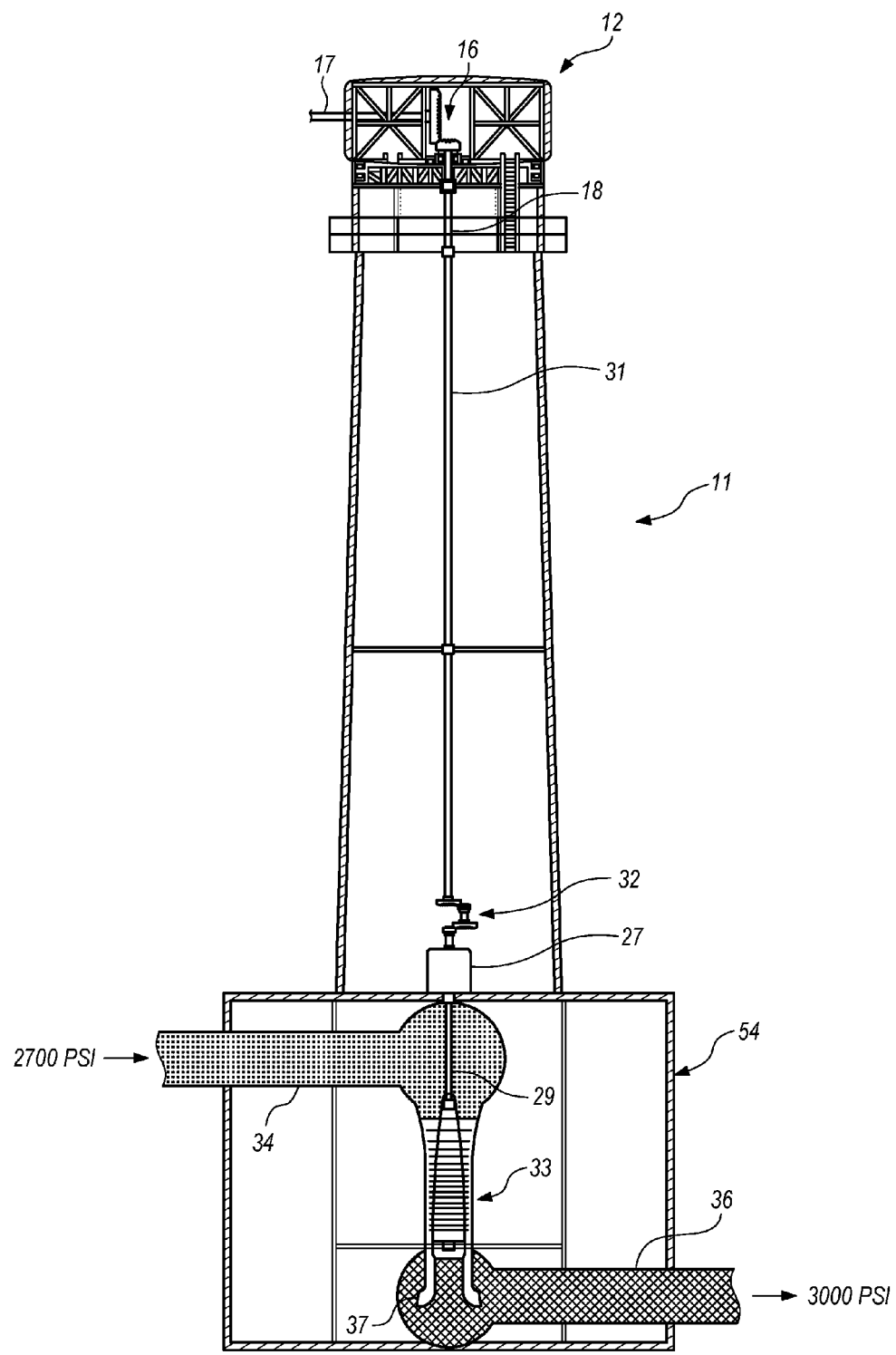
FIG. 18 is a cross-sectional view of a stage 10 wind turbine, showing the gas supplied at approximately 2700 psi from a stage 9 turbine and being outputted at approximately 3000 psi to the ring tank storage system.
Figures 19, 20:
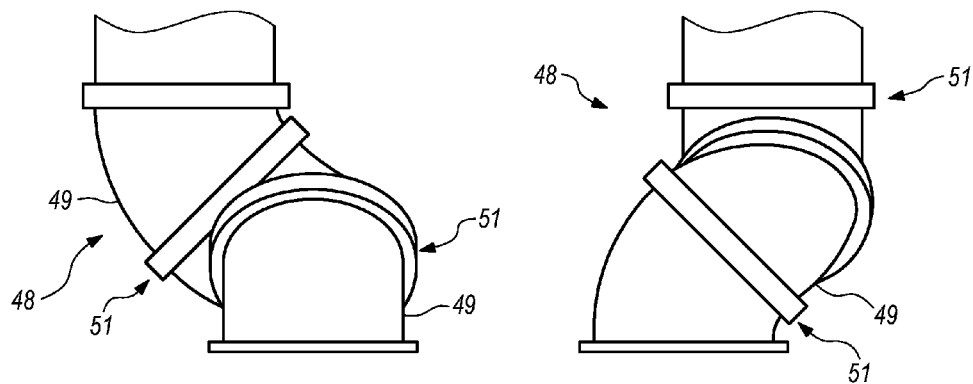
FIG. 19 is a front elevational view of a 3-axis air swivel coupling.
FIG. 20 is a right side elevational view of a 3-axis air swivel coupling.
Figures 21, 22:
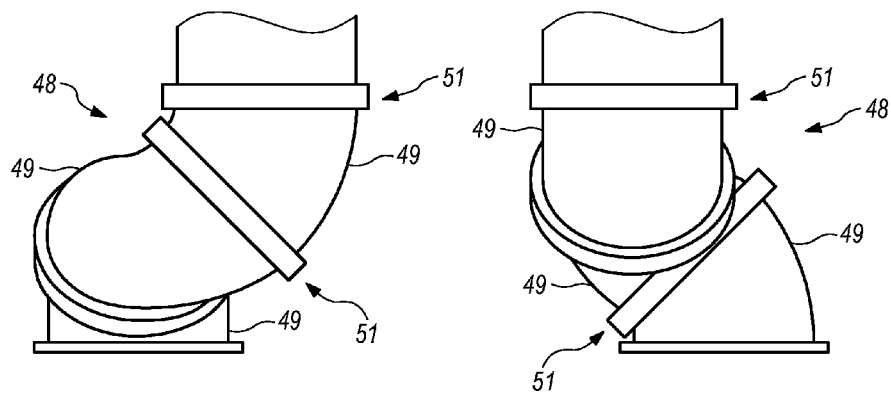
FIG. 21 is a rear elevational view of a 3-axis air swivel coupling.
FIG. 22 is a left side elevational view of a 3-axis air swivel coupling.

Turning now to FIG. 16, another type of stage 1 wind turbine 11 is shown. It should be noted that the gas inlet 34 is being fed gas at 15 psi from return line 56. This is the type of stage 1 wind turbine 11 which would be employed in the closed system, shown in FIG. 14A. The turbine gas compressor 33 delivers gas at approximately 300 psi through gas outlet 36 to a stage 2 wind turbine. FIG. 17 shows a stage 5 wind turbine 11. The construction of this wind turbine 11 is identical to that of the stage 1 wind turbine, with the exception that its gas inlet 34 is receiving gas at approximately 1200 psi, and its gas outlet 36 is outputting gas at approximately 1500 psi. FIG. 18 shows a stage 10 wind turbine 11. The construction of this wind turbine 11 is identical to that of the stage 1-9 wind turbines 11, with the exception that its gas inlet 34 is receiving gas at approximately 2700 psi, and its gas outlet 36 is outputting gas at approximately 3000 psi.

The combined output from the wind turbines 11 is fed through a high pressure output line 58 to a storage tank system 59 adapted to store a large quantity of compressed gas. The storage tank system 59 includes a plurality of concentric ring-like tanks, each tank being interconnected to inner and outer adjacent tanks through pressure actuated transfer valves 60. The actuating or threshold pressure of the pressure actuated valves 60 is such that each tank stores compressed gas at a respective stepped pressure, varying from the highest pressure central tank, fed by the gas outputted from the last stage of the wind turbines, to the lowest pressure outermost tank 61. In the respects described so far, the construction and operation of the storage tank system 59 is identical to that disclosed in U.S. Pat. No. 9,030,039.

However, the present invention has a simplified and improved gas cooling and heating circulation system from that shown in the '039 Patent. The outermost ring tank 61 includes a heat exchanger line 62, provided with a plurality of peripheral fins 63 to enhance the transfer of heat. Heat exchanger line 62 has an inlet connected to a first cooling line 64 and an outlet connected to a second cooling line 66. First cooling line 64 is preferably connected to the gas outputted by the stage 5 wind turbines, in the first plurality 67 of wind turbines comprising all of the wind turbines in stages 1-5, inclusive. Second cooling line 66 is connected to the gas inputted into the stage 6 wind turbines, in the second plurality 68 of wind turbines comprising all of the wind turbines in stages 6-10, inclusive. See, FIGS. 14A and 14B.

It should be noted that the heat exchanger line 62 could be interconnected between, for example, stages 3 and 4, or stages 7 and 8. Or, there could be more than one heat exchanger line in a system.

Heat exchanger line 62 passes through outermost ring tank 61, and is effective to transfer heat from gas outputted by from the outputs of the stage 5 wind turbines within the first plurality 67 of wind turbines 11 into the gas contained within outermost ring tank 61, and to return cooled gas passing through said second cooling line to the inputs of the stage 6 wind turbines within the second plurality 68 of wind turbines 11.

This increases the efficiency of the higher pressure output wind turbines 11 by drawing off hot gas outputted by a selected row of wind turbines, and circulating that hot gas through heat exchanger line 62 passing through the outermost ring tank 61 in the storage tank system 59. Because the gas in the outermost ring tank 61 is relatively cool from the successive stages of gas expansion, this contained volume of stored pressurized gas is effective to cool the hot incoming gas circulated from the stage 5 row of wind turbines 11. This cooled gas is then returned to the stage 6 row of wind turbines 11, making their operation more efficient.

Through this heat exchange process, the excessive heat from gas circulated through the heat exchanger line 62 is effective to raise the temperature of the gas stored in the outermost ring tank 61. Compressed gas from the outermost ring tank 61 is fed to one or more gas turbines 57 driving a respective electrical generator 69 connected to a transformer 71. By utilizing the excessive heat generated by the first plurality 67 of wind turbines 11 and raising the temperature of the gas within the outermost ring tank 61, the operation of the gas turbines 57 driving the electrical generators 69 is made more efficient.

Figure 2:
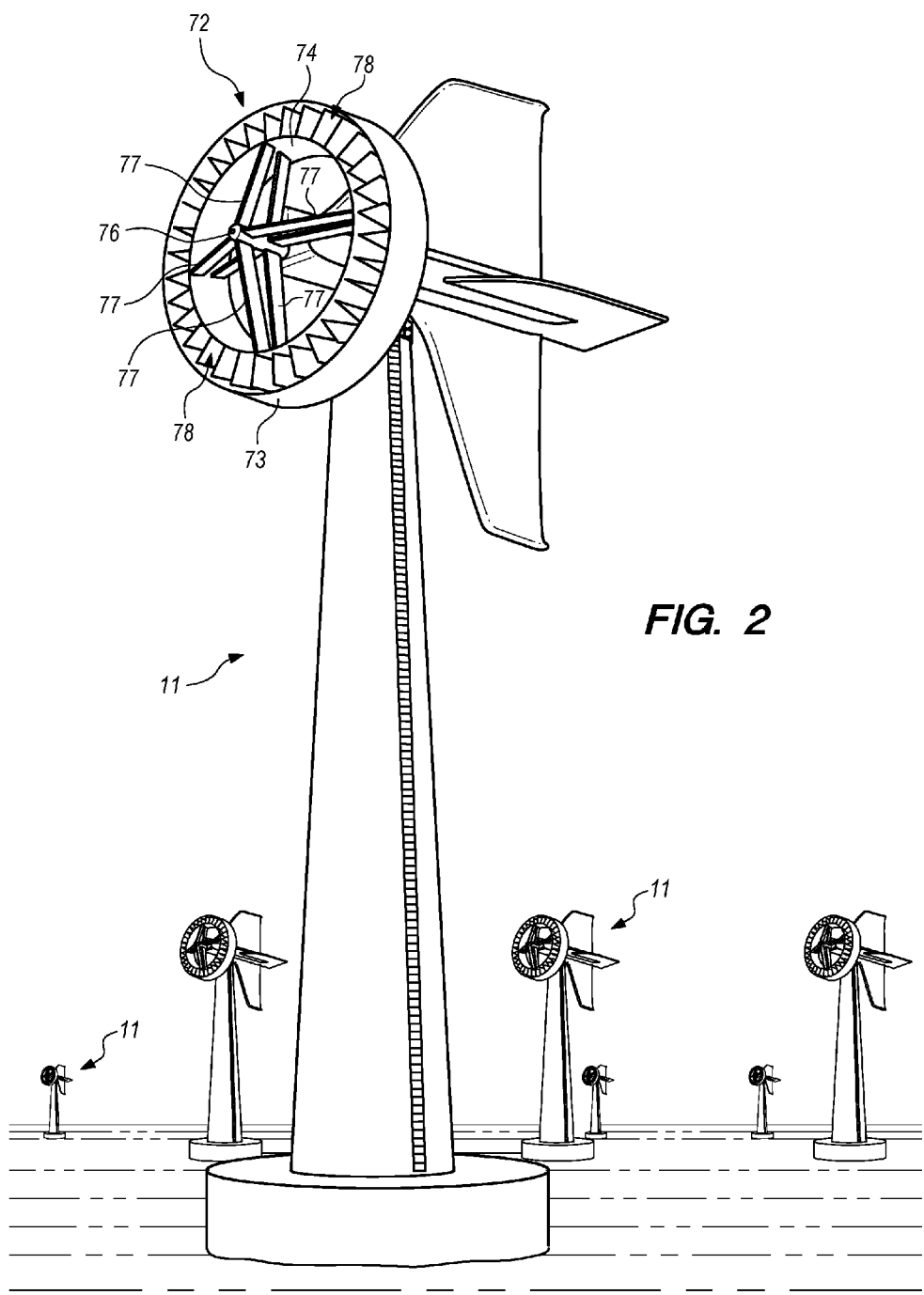
FIG. 2 is a perspective view of a plurality of wind turbines of a second embodiment, shown installed in a deep water environment.
Figure 6:
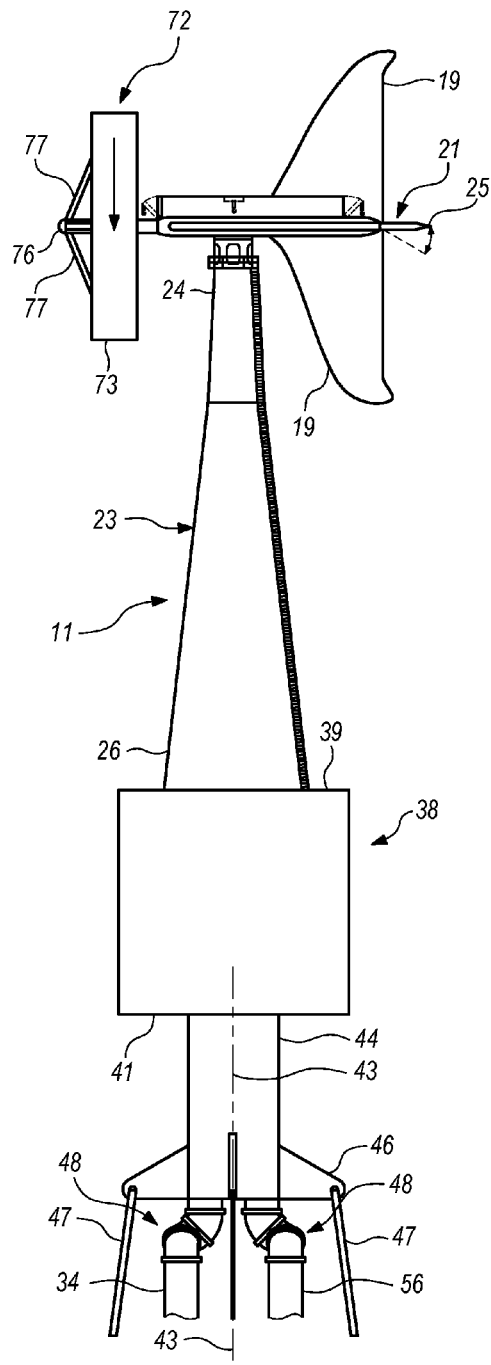
FIG. 6 is a side elevational view of the second embodiment of the wind turbine adapted for deep water mooring, showing the ring fan propeller, a heavy duty support tower, a flotation tank, a ballast keel, and 3-axis couplings for the input and output gas lines.
Figure 7:
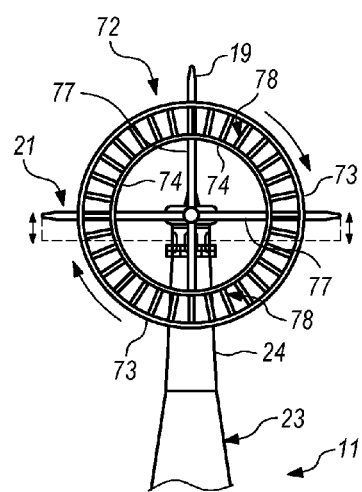
FIG. 7 is a fragmentary, front elevational view of wind turbine head of FIG. 6, the representation of the elevator in broken line corresponding to its position during low or no wind conditions.
Figure 8:
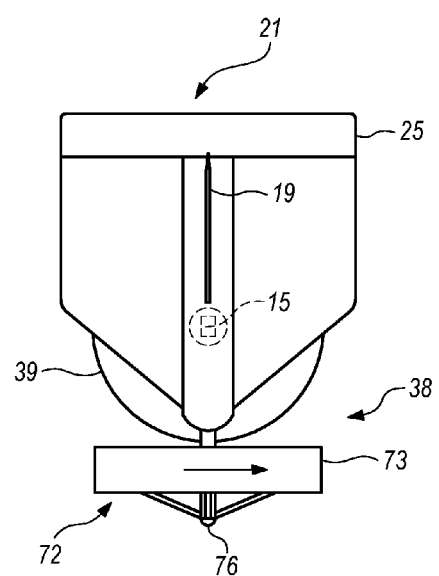
FIG. 8 is a top plan view of the wind turbine of FIG. 6.
Figure 12:
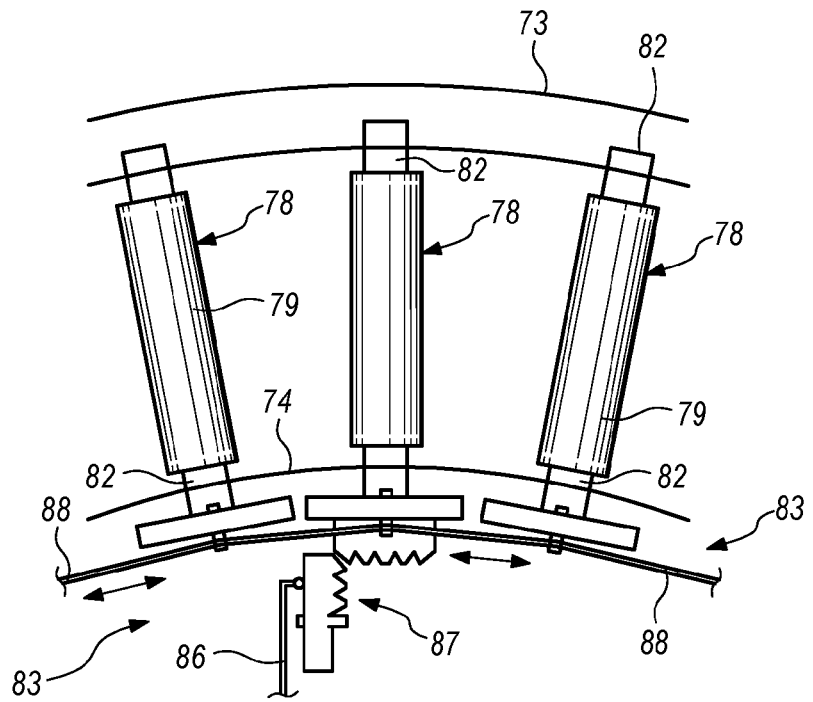
FIG. 12 is a fragmentary front elevational view of the propeller blades in FIG. 11, showing the cowling and a portion of the feathering mechanism.
Figure 13:
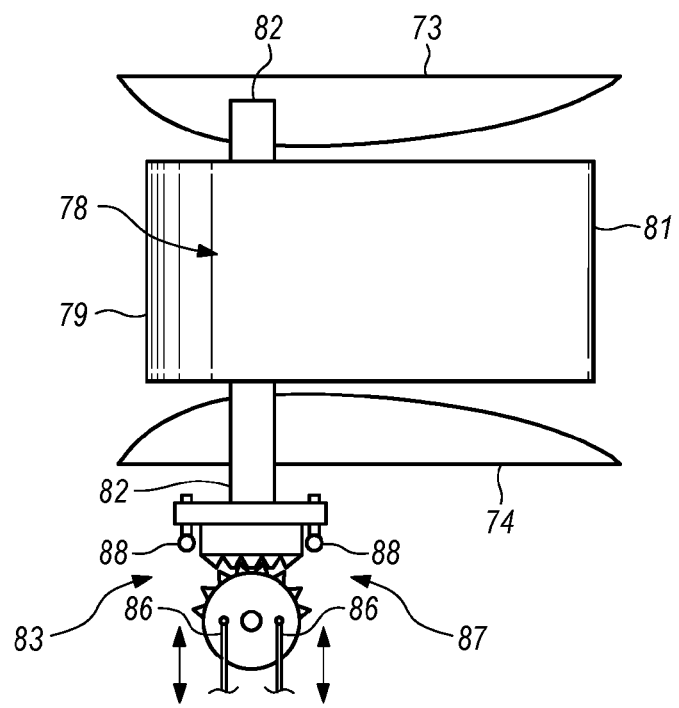
FIG. 13 is a fragmentary side elevational view of one of the propeller blades of FIG. 11, showing the cowling and a portion of the feathering mechanism.

A second embodiment of the wind turbine 11 is shown generally in FIG. 2, and more specifically in FIGS. 6-8, inclusive and in FIGS. 11-13, inclusive. This second embodiment shares many features with the first embodiment described above, but includes a head portion 12 having a different apparatus for converting incoming wind to rotational forces for driving its turbine gas compressor 33.

Head portion 12 of the second embodiment has a ring fan propeller 72 attached to shaft 17. Ring fan propeller 72 comprises a peripheral outer ring or cowling 73, a concentric inner ring or cowling 74, and a central hub 76. Ring fan propeller 72 further has a plurality of support arms 77 extending radially from hub 76 to inner ring 74, and a plurality of propeller blades 78 positioned transversely between inner ring 74 and outer ring 73. Each blade 78 has an leading edge 79 and a trailing edge 81. The inner and outer rings serve to redirect and compress air at the leading edges 79 of the propeller blades 78 in order to drive them more effectively, as well as to create a vacuum at the trailing edges 81 in order to accelerate the exhaust of air passing through the propeller blades 78. Each blade 78 is pivotally mounted adjacent its leading edge 79 for rotation about a shaft 82 having an axis transverse to a respective blade 78.

Ring fan propeller 72 further includes means 83 to rotate propeller blades 78 from a first rotational position where the blades 78 are fully engaged with incoming wind, and a second rotational position where the blades 78 are minimally engaged with incoming wind. More specifically, means 83 comprises a rack and pinion 84, primary tension bars 86, bevel gear assembly 87, and secondary tension bars 88. Rack and pinion 84 is slidably and rotationally mounted over first shaft 17, so that the entire ring fan propeller 72 can rotate while allowing blades 78 to be appropriately adjusted by movement of the remainder of the feathering and braking means 21 in response to movement of elevator 25. In this manner, each of the propeller blades 78 may be feathered to a fully neutral position in reaction to very high wind velocity.

It will be appreciated, then, that I have disclosed an improved wind turbine and a compressed gas storage system capable of being located on land or over water, which apparatus makes wind energy storable and dispatchable, making possible the supply of base load and peak load requirements, and overcoming the intermittence of wind, one of the main problems associated with the generation of electricity by wind power.

What is claimed is:
1. A wind turbine comprising:
  a. a head portion having at least two propeller blades extending radially from a hub, said at least two propeller blades having respective longitudinal axes and being mounted to said hub for rotation about said axes between a first rotational position where said propeller blades are fully engaged with incoming wind and a second rotational position where said propeller blades are minimally engaged with incoming wind, said hub being mounted for rotation on a front end of said head portion, a gear assembly mounted in said head portion between said front end and a rear end of said head portion, said gear assembly having a first shaft interconnected to said hub, and a second shaft directed vertically and downwardly, a rudder mounted on said rear end of said head portion, feathering and braking means responsive to the incoming wind, for maintaining said propeller blades in said first rotational position when the incoming winds are light and moderate, and for progressively and proportionally rotating said propeller blades into said second rotational position as the incoming winds increase from moderate to strong in strength, said feathering and braking means further applying rotational braking forces to said first shaft when the incoming winds are strong in strength;

b. a tower, said tower having an upper end and a lower end, said head portion being rotationally mounted to said upper end of said tower;
c. a turbine gas compressor, said compressor having a gas inlet and a gas outlet;
d. a gear box located adjacent said lower end of said tower, said gear box having an input shaft and an output shaft, said output shaft being connected to said compressor,
e. a main shaft, said main shaft being vertically oriented and extending from said second shaft of said gear assembly to said input shaft of said gear box; and,
f. wherein said feathering and braking means includes a fin assembly on said rear end of said head portion, and in which said fin assembly has a horizontal portion with a trailing edge and an elevator pivotally attached to said trailing edge.

2. A wind turbine as in claim 1 in which said gear assembly is a bevel gear.

3. A wind turbine as in claim 1 further including at least one derrick mounted on said head portion.

4. A wind turbine as in claim 1 further including a flotation tank, said flotation tank having a top end and a bottom end, in which said top end of said flotation tank is attached to said lower end of said tower, and further including a ballast keel having a vertical axis, an upper portion and a lower portion, in which said vertical axis is aligned with a longitudinal axis of said tower and said upper portion is attached to said bottom end of said flotation tank, and further including a plurality of mooring cables attached to said lower portion of said ballast keel.

5. A wind turbine as in claim 4 further including a three-axis coupling in communication with said gas outlet of said turbine gas compressor, said three-axis coupling comprising a plurality of curved sections of pipe joined by a plurality of swivel joints, said swivel joints including means for maintaining a seal within a respective said swivel joint irrespective of the position or rotation of said pipe sections.

6. A wind turbine as in claim 5 further including a three-axis coupling in communication with said gas inlet of said turbine gas compressor, said three-axis coupling comprising a plurality of curved sections of pipe joined by a plurality of swivel joints, said swivel joints including means for maintaining a seal within a respective said swivel joint irrespective of the position or rotation of said pipe sections.

7. A wind turbine comprising:
a. a head portion having a ring fan propeller, said ring fan propeller comprising a peripheral outer ring, a concentric inner ring, and a central hub, said fan propeller further having a plurality of support arms extending radially from said hub to said inner ring, said fan propeller further including a plurality of propeller blades located transversely between said inner ring and said outer ring, each of said blades having a leading edge and a trailing edge end and being pivotally mounted adjacent said leading edge for rotation about a transverse axis, further including means to rotate said blades from a first rotational position where said blades are fully engaged with incoming wind and a second rotational position where said blades are minimally engaged with incoming wind, said hub being mounted for rotation on a front end of said head portion;
a gear assembly mounted in said head portion between said front end and a rear end of said head portion, said gear assembly having a first shaft interconnected to said hub, and a second shaft directed vertically and downwardly;
a rudder mounted on said rear end of said head portion;
feathering and braking means responsive to the incoming wind and interconnected to said means for rotating said blades, for maintaining said blades in said first rotational position when the incoming winds are light and moderate, and for progressively and proportionally rotating said blades into said second rotational position as the incoming winds increase from moderate to strong in strength, said feathering and braking means further applying rotational braking forces to said first shaft when the incoming winds are strong in strength;
b. a tower, said tower having an upper end and a lower end, said head portion being rotationally mounted to said upper end of said tower;
c. a turbine gas compressor, said compressor having a gas inlet and a gas outlet;
d. a gear box located adjacent said lower end of said tower, said gear box having an input shaft and an output shaft, said output shaft being connected to said compressor,
e. a main shaft, said main shaft being vertically oriented and extending from said second shaft of said gear assembly to said input shaft of said gear box; and
f. wherein said feathering and braking means includes a fin assembly on said rear end of said head portion, and in which said fin assembly has a horizontal portion with a trailing edge and an elevator pivotally attached to said trailing edge.

8. A wind turbine as in claim 7 in which said gear assembly is a bevel gear.

9. A wind turbine as in claim 7 further including at least one derrick mounted on said head portion.

10. A wind turbine as in claim 7 further including a flotation tank, said flotation tank having a top end and a bottom end, in which said top end of said flotation tank is attached to said lower end of said tower, and further including a ballast keel having a vertical axis, an upper portion and a lower portion, in which said vertical axis is aligned with a longitudinal axis of said tower and said upper portion is attached to said bottom end of said flotation tank, and further including a plurality of mooring cables attached to said lower portion of said ballast keel.

11. A wind turbine as in claim 10 further including a three-axis coupling in communication with said gas outlet of said turbine gas compressor, said three-axis coupling comprising a plurality of curved sections of pipe joined by a plurality of swivel joints, said swivel joints including means for maintaining a seal within a respective said swivel joint irrespective of the position or rotation of said pipe sections.

12. A wind turbine as in claim 11 further including a three-axis coupling in communication with said gas inlet of said turbine gas compressor, said three-axis coupling comprising a plurality of curved sections of pipe joined by a plurality of swivel joints, said swivel joints including means for maintaining a seal within a respective said swivel joint irrespective of the position or rotation of said pipe sections.

13. A plurality of wind turbines, serially interconnected for staged compression to output high pressure gas, comprising:
a. a first wind turbine comprising: a head portion having a propeller with a plurality of propeller blades and a hub, further including means to rotate said blades from a first rotational position where said blades are fully engaged with incoming wind and a second rotational position where said blades are minimally engaged with incoming wind, said hub being mounted for rotation on a front end of said head portion; a gear assembly mounted in said head portion between said front end and a rear end of said head portion, said gear assembly having a first shaft interconnected to said hub, and a second shaft directed vertically and downwardly; a rudder mounted on said rear end of said head portion, feathering and braking means responsive to the incoming wind and interconnected to said means for rotating said blades, for maintaining said blades in said first rotational position when the incoming winds are light and moderate, and for progressively and proportionally rotating said propeller blades into said second rotational position as the incoming winds increase from moderate to strong in strength, said feathering and braking means further applying rotational braking forces to said first shaft when said incoming winds are strong in strength;
a tower, said tower having an upper end and a lower end, said head portion being rotationally mounted to said upper end of said tower;
a turbine gas compressor, said compressor having a gas inlet and a gas outlet, said gas outlet being connected to a first turbine gas supply line with a check valve therein;
a gear box located adjacent said lower end of said tower, said gear box having an input shaft and an output shaft, said output shaft being connected to said compressor; and,
a main shaft, said main shaft being vertically oriented and extending from said second shaft of said gear assembly to said input shaft of said gear box; and,
b. a second wind turbine comprising: a head portion having a propeller with a plurality of propeller blades and a hub, further including means to rotate said blades from a first rotational position where said blades are fully engaged with incoming wind and a second rotational position where said blades are minimally engaged with incoming wind, said hub being mounted for rotation on a front end of said head portion; a gear assembly mounted in said head portion between said front end and a rear end of said head portion, said gear assembly having a first shaft interconnected to said hub, and a second shaft directed vertically and downwardly; a rudder mounted on said rear end of said head portion; feathering and braking means responsive to the incoming wind and interconnected to said means for rotating said blades, for maintaining said blades in said first rotational position when the incoming winds are light and moderate, and for progressively and proportionally rotating said blades into said second rotational position as the incoming winds increase from moderate to strong in strength, said feathering and braking means further applying rotational braking forces to said first shaft when said incoming winds are strong in strength;
a tower, said tower having an upper end and a lower end, said head portion being rotationally mounted to said upper end of said tower;
a turbine gas compressor, said compressor having a gas inlet and a gas outlet, said gas inlet being connected to said first turbine gas supply line and said gas outlet being connected to a second turbine gas supply line with a check valve therein;
a gear box located adjacent said lower end of said tower, said gear box having an input shaft and an output shaft, said output shaft being connected to said compressor; and,
a main shaft, said main shaft being vertically oriented and extending from said second shaft of said gear assembly to said input shaft of said gear box, whereby compressed gas produced by said first wind turbine is increased in pressure by said second wind turbine.

14. A wind turbine system for generating electrical power, comprising:
a. a first plurality of wind turbines, each of said wind turbines including a head portion having a propeller with a plurality of propeller blades and a hub, further including means to rotate said blades from a first rotational position where said blades are fully engaged with incoming wind and a second rotational position where said blades are minimally engaged with incoming wind, said hub being mounted for rotation on a front end of said head portion; a gear assembly mounted in said head portion between said front end and a rear end of said head portion, said gear assembly having a first shaft interconnected to said hub, and a second shaft directed vertically and downwardly; a rudder mounted on said rear end of said head portion, feathering and braking means responsive to the incoming wind and interconnected to said means for rotating said blades, for maintaining said blades in said first rotational position when the incoming winds are light and moderate, and for progressively and proportionally rotating said propeller blades into said second rotational position as the incoming winds increase from moderate to strong in strength, said feathering and braking means further applying rotational braking forces to said first shaft when said incoming winds are strong in strength; a tower, said tower having an upper end and a lower end, said head portion being rotationally mounted to said upper end of said tower; a turbine gas compressor, said compressor having a gas inlet and a gas outlet, said gas outlet being connected to a first turbine gas supply line with a check valve therein; a gear box located adjacent said lower end of said tower, said gear box having an input shaft and an output shaft, said output shaft being connected to said compressor; and, a main shaft, said main shaft being vertically oriented and extending from said second shaft of said gear assembly to said input shaft of said gear box; said first plurality of wind turbines being serially interconnected for staged compression by connecting a respective gas outlet of a first wind turbine to a respective gas inlet of a second wind turbine and by connecting successive wind turbines in identical fashion to output high pressure compressed gas from a gas outlet of a last wind turbine of said first plurality of wind turbines into a first cooling line;
b. a second plurality of wind turbines, each of said wind turbines including a head portion having a propeller with a plurality of propeller blades and a hub, further including means to rotate said blades from a first rotational position where said blades are fully engaged with incoming wind and a second rotational position where said blades are minimally engaged with incoming wind, said hub being mounted for rotation on a front end of said head portion; a gear assembly mounted in said head portion between said front end and a rear end of said head portion, said gear assembly having an first shaft interconnected to said hub, and a second shaft directed vertically and downwardly; a rudder mounted on said rear end of said head portion, feathering and braking means responsive to the incoming wind and interconnected to said means for rotating said blades, for maintaining said blades in said first rotational position when the incoming winds are light and moderate, and for progressively and proportionally rotating said propeller blades into said second rotational position as the incoming winds increase from moderate to strong in strength, said feathering and braking means further applying rotational braking forces to said first shaft when said incoming winds are strong in strength; a tower, said tower having an upper end and a lower end, said head portion being rotationally mounted to said upper end of said tower; a turbine gas compressor, said compressor having a gas inlet and a gas outlet, said gas outlet being connected to a first turbine gas supply line with a check valve therein; a gear box located adjacent said lower end of said tower, said gear box having an input shaft and an output shaft, said output shaft being connected to said compressor; and, a main shaft, said main shaft being vertically oriented and extending from said second shaft of said gear assembly to said input shaft of said gear box; said second plurality of wind turbines being serially interconnected for staged compression by connecting a respective gas outlet of a first wind turbine to a respective gas inlet of a second wind turbine and by connecting successive wind turbines in identical fashion to output high pressure compressed gas from said second plurality of wind turbines, said gas inlet of said first wind turbine of said second plurality of wind turbines being interconnected to a second cooling line;

c. a storage tank system for receiving said high pressure compressed air outputted from said second plurality of wind turbines, said tank system comprising a central tank surrounded by a plurality of concentric, ring-like tanks, said central tank and said ring-like tanks being respectively interconnected by pressure-actuated valves, each tank being adapted for storing compressed air at stepped pressures, varying from a highest pressure in said central tank, to a lowest pressure in an outermost ring tank, said outermost ring tank including a heat exchanger line, said heat exchanger line having an inlet connected to said first cooling line and an outlet connected to said second cooling line, said heat exchanger passing through said outer ring tank and effective to transfer heat from gas outputted by said first plurality of wind turbines into gas contained within said outer ring tank, and to return cooled gas passing through said second cooling line to said second plurality of wind turbines.

15. A wind turbine system for generating electrical power as in claim 14, in which said outermost ring tank has a contained volume, and in which said heat exchanger line passes through said contained volume.

16. A wind turbine system for generating electrical power as in claim 15, in which said heat exchanger line includes fins for enhancing the transfer of heat from said heat exchanger line to gas contained in said outermost ring tank.

17. A wind turbine system for generating electrical power as in claim 14 including at least one gas turbine having an inlet in communication with said outermost ring tank, and an output drive shaft interconnected to an electrical generator.

18. A wind turbine system for generating electrical power as in claim 17, in which said at least one gas turbine has an outlet for return air, and said outlet is interconnected to said gas inlet of said first wind turbine of said first plurality of wind turbines.

* * * * *